US 10,108,421 B2

(12) United States Patent
Col et al.

(10) Patent No.: US 10,108,421 B2
(45) Date of Patent: *Oct. 23, 2018

(54) MECHANISM TO PRECLUDE SHARED RAM-DEPENDENT LOAD REPLAYS IN AN OUT-OF-ORDER PROCESSOR

(71) Applicant: VIA ALLIANCE SEMICONDUCTOR CO., LTD., Shanghai (CN)

(72) Inventors: Gerard M. Col, Austin, TX (US); Colin Eddy, Austin, TX (US); G. Glenn Henry, Austin, TX (US)

(73) Assignee: VIA ALLIANCE SEMICONDUCTOR CO., LTD, Shanghai (CN)

( * ) Notice: Subject to any disclaimer, the term of this patent is extended or adjusted under 35 U.S.C. 154(b) by 142 days.

This patent is subject to a terminal disclaimer.

(21) Appl. No.: 14/950,555

(22) Filed: Nov. 24, 2015

(65) Prior Publication Data

US 2016/0170759 A1    Jun. 16, 2016

Related U.S. Application Data

(63) Continuation of application No. 14/889,270, filed as application No. PCT/IB2014/003262 on Dec. 14, 2014.

(51) Int. Cl.
*G06F 9/38* (2018.01)
*G06F 9/30* (2018.01)
*G06F 1/32* (2006.01)

(52) U.S. Cl.
CPC ........ *G06F 9/30083* (2013.01); *G06F 1/3296* (2013.01); *G06F 9/3834* (2013.01)

(58) Field of Classification Search
CPC .................... G06F 9/3838; G06F 9/30043
See application file for complete search history.

(56) References Cited

U.S. PATENT DOCUMENTS 5,636,374 A    6/1997   Rodgers et al.
5,649,138 A    7/1997   Ireton
(Continued)

FOREIGN PATENT DOCUMENTS

CN    101377736 A    3/2009
CN    101477454 A    7/2009
(Continued)

OTHER PUBLICATIONS

"Write Combining Memory Implementation Guidelines." Intel® Nov. 1998. pp. 4-17 Order No. 244422-001.
(Continued)

*Primary Examiner* — Andrew Caldwell
*Assistant Examiner* — Michael J Metzger
(74) *Attorney, Agent, or Firm* — McClure, Qualey & Rodack, LLP

(57) ABSTRACT

An apparatus including first and second reservation stations. The first reservation station dispatches a load micro instruction, and indicates on a hold bus if the load micro instruction is a specified load micro instruction directed to retrieve an operand from a prescribed resource other than on-core cache memory. The second reservation station is coupled to the hold bus, and dispatches one or more younger micro instructions therein that depend on the load micro instruction for execution after a number of clock cycles following dispatch of the first load micro instruction, and if it is indicated on the hold bus that the load micro instruction is the specified load micro instruction, the second reservation station is configured to stall dispatch of the one or more younger micro instructions until the load micro instruction has retrieved the
(Continued)

operand. The plurality of non-core resources includes a random access memory, configured to store microcode patches corresponding to the out-of-order processor which, upon initialization, accesses said random access memory to retrieve said microcode patches.

12 Claims, 5 Drawing Sheets

(56) References Cited

U.S. PATENT DOCUMENTS

| | | | |
|---|---|---|---|
| 5,809,275 | A | 9/1998 | Lesartre |
| 5,889,679 | A | 3/1999 | Henry et al. |
| 5,958,041 | A | 9/1999 | Petolino, Jr. et al. |
| 6,163,838 | A | 12/2000 | Amit et al. |
| 6,549,985 | B1 | 4/2003 | Gaskin et al. |
| 6,965,987 | B2 | 11/2005 | Senter Brashears et al. |
| 6,981,129 | B1 | 12/2005 | Boggs et al. |
| 7,065,632 | B1* | 6/2006 | Col ................... G06F 9/3834 712/218 |
| 7,200,737 | B1 | 4/2007 | Merchant et al. |
| 7,203,817 | B2* | 4/2007 | Yeh .................... G06F 9/3826 712/216 |
| 7,284,117 | B1 | 10/2007 | Radhakrishnan et al. |
| 7,330,959 | B1 | 2/2008 | Anvin |
| 7,937,563 | B2 | 5/2011 | Naffziger et al. |
| 8,190,864 | B1 | 5/2012 | Jordan et al. |
| 8,879,345 | B1 | 11/2014 | Henry et al. |
| 8,918,625 | B1 | 12/2014 | O'Bleness et al. |
| 9,389,863 | B2 | 7/2016 | Henry et al. |
| 2002/0087846 | A1 | 7/2002 | Nickolls et al. |
| 2003/0061470 | A1 | 3/2003 | Yeh |
| 2003/0088740 | A1 | 5/2003 | Henry et al. |
| 2003/0126405 | A1 | 7/2003 | Sager et al. |
| 2004/0064680 | A1 | 4/2004 | Kadambi et al. |
| 2005/0071563 | A1 | 3/2005 | Kuttanna et al. |
| 2006/0248319 | A1 | 11/2006 | Kadambi |
| 2007/0204135 | A1 | 8/2007 | Jiang |
| 2007/0204138 | A1 | 8/2007 | Savransky et al. |
| 2008/0005504 | A1 | 1/2008 | Barnes et al. |
| 2008/0016323 | A1 | 1/2008 | Henry et al. |
| 2008/0028193 | A1 | 1/2008 | Dhodapkar |
| 2008/0040589 | A1 | 2/2008 | Sakamoto et al. |
| 2008/0086622 | A1 | 4/2008 | Chang et al. |
| 2008/0162895 | A1 | 7/2008 | Luick |
| 2008/0243985 | A1 | 10/2008 | Tang et al. |
| 2008/0256336 | A1 | 10/2008 | Henry et al. |
| 2009/0024838 | A1* | 1/2009 | Dhodapkar ........... G06F 9/3836 712/214 |
| 2009/0031121 | A1* | 1/2009 | Henry .................... G06F 8/66 712/226 |
| 2009/0172360 | A1 | 7/2009 | Hikichi |
| 2009/0327657 | A1 | 12/2009 | Sperber et al. |
| 2010/0011198 | A1 | 1/2010 | Hooker et al. |
| 2010/0064120 | A1 | 3/2010 | Chang et al. |
| 2010/0306509 | A1 | 12/2010 | Day et al. |
| 2011/0010531 | A1 | 1/2011 | Henry et al. |
| 2011/0029760 | A1 | 2/2011 | Elmer et al. |
| 2011/0040955 | A1 | 2/2011 | Hooker et al. |
| 2011/0047360 | A1 | 2/2011 | Maloney |
| 2011/0078350 | A1 | 3/2011 | Carls |
| 2011/0153991 | A1 | 6/2011 | Busaba et al. |
| 2011/0161632 | A1 | 6/2011 | Sha et al. |
| 2012/0173853 | A1 | 7/2012 | Ukai |
| 2012/0221796 | A1 | 8/2012 | Tran |
| 2012/0290820 | A1 | 11/2012 | Olson et al. |
| 2013/0124829 | A1 | 5/2013 | Chou et al. |
| 2013/0205117 | A1 | 8/2013 | Palanca et al. |
| 2013/0298127 | A1 | 11/2013 | Meier et al. |
| 2013/0339679 | A1 | 12/2013 | Iyer et al. |
| 2013/0346729 | A1 | 12/2013 | Barowski et al. |
| 2014/0025933 | A1 | 1/2014 | Venkataramanan et al. |
| 2014/0089635 | A1 | 3/2014 | Shifer et al. |
| 2014/0181476 | A1 | 6/2014 | Srinivasan et al. |
| 2014/0189328 | A1 | 7/2014 | Weiner et al. |
| 2014/0208074 | A1 | 7/2014 | Babayan et al. |
| 2014/0223143 | A1 | 8/2014 | Heil et al. |
| 2014/0223144 | A1* | 8/2014 | Heil .................... G06F 9/30043 712/214 |
| 2014/0337581 | A1 | 11/2014 | Meier |
| 2014/0380023 | A1 | 12/2014 | Smaus et al. |
| 2014/0380024 | A1 | 12/2014 | Spadini et al. |
| 2015/0026685 | A1 | 1/2015 | Spadini et al. |
| 2015/0026686 | A1 | 1/2015 | Spadini et al. |
| 2015/0095627 | A1 | 4/2015 | Dechene et al. |
| 2015/0106597 | A1* | 4/2015 | Godard ............... G06F 12/0893 712/225 |
| 2015/0113250 | A1* | 4/2015 | Henry ................. G06F 9/30145 712/208 |
| 2015/0113253 | A1* | 4/2015 | Henry ...................... G06F 9/28 712/220 |
| 2015/0309792 | A1 | 10/2015 | Meier et al. |
| 2016/0306415 | A1 | 10/2016 | Herdrich et al. |

FOREIGN PATENT DOCUMENTS

| | | |
|---|---|---|
| CN | 101526895 A | 9/2009 |
| CN | 101681261 A | 3/2010 |
| CN | 101710272 A | 5/2010 |
| CN | 101847094 | 9/2010 |
| CN | 101853150 A | 10/2010 |
| CN | 101894009 A | 11/2010 |
| CN | 102087591 A | 6/2011 |
| CN | 103620555 A | 3/2014 |
| CN | 103942033 A | 7/2014 |
| CN | 104183270 A | 12/2014 |
| EP | 1296230 A2 | 3/2003 |
| EP | 2660716 | 11/2013 |
| GB | 2510655 A | 8/2014 |
| JP | 2006146953 A | 6/2006 |
| JP | 2006318051 A | 11/2006 |
| KR | 1020140139923 A | 12/2014 |
| TW | 201042543 | 12/2010 |
| TW | 201301136 | 1/2013 |
| WO | WO2014052529 A1 | 4/2014 |

OTHER PUBLICATIONS

Kessler, R.E. et al. "The Alpha 21264 Microprocessor Architecture." Proceedings. International Conference on Computer Design: VLSI in Computers and Processors, ICCD'98. IEEE, Oct. 7, 1998, pp. 90-95.

Kobayashi et al. "A Study on an Operating System for Managing Object Code Optimized for Fine-grain Power Gating Control." IPSJ SIG Technical Report, Software and Operating System (OS), Information Processing Society of Japan. Jun. 15, 2011. No. 117. pp. 1-8.

Hennessy, John L. et al. "Computer Architecture: A Quantitative Approach." 4th Edition. 2007. Morgan Kaufmann Publishers Inc., San Francisco, CA. USA. pp. 18-19 and B2-B3.

PCT/IB2014/003255. International Search Report (ISR) and Written Opinion (WO). Provided by State Intellectual Property Office of the P.R. China. dated Aug. 27, 2015. pp. 1-8.

PCT/IB2014/003255. International Search Report (ISR) and Written Opinion (WO). Provided by European Patent Office. dated Sep. 1, 2015. pp. 1-8.

PCT/IB2014/003177. International Search Report (ISR) and Written Opinion (WO). Provided by State Intellectual Property Office of the P.R. China. dated Sep. 9, 2015. pp. 1-9.

PCT/IB2014/003217. International Search Report (ISR) and Written Opinion (WO). Provided by European Patent Office. dated Sep. 1, 2015. pp. 1-8.

PCT/IB2014/003217. International Search Report (ISR) and Written Opinion (WO). Provided by State Intellectual Property Office of the P.R. China. dated Jun. 26, 2015. pp. 1-11.

PCT/IB2014/003179. International Search Report (ISR) and Written Opinion (WO). Provided by State Intellectual Property Office of the P.R. China. dated Jun. 26, 2015. pp. 1-8.

PCT/IB2014/003179. International Search Report (ISR) and Written Opinion (WO). Provided by European Patent Office. dated Sep. 1, 2015. pp. 1-8.

(56) References Cited

OTHER PUBLICATIONS

PCT/IB2014/003098. International Search Report (ISR) and Written Opinion (WO). Provided by State Intellectual Property Office of the P.R. China. dated Jul. 30, 2015. pp. 1-9.
PCT/IB2014/003215. International Search Report (ISR) and Written Opinion (WO). Provided by State Intellectual Property Office of the P.R. China. dated Jun. 26, 2015. pp. 1-11.
PCT/IB2014/003215. International Search Report (ISR) and Written Opinion (WO). Provided by European Patent Office. dated Sep. 1, 2015. pp. 1-8.
PCT/IB2014/003218. International Search Report (ISR) and Written Opinion (WO). Provided by State Intellectual Property Office of the P.R. China. dated Aug. 27, 2015. pp. 1-9.
PCT/IB2014/003218. International Search Report (ISR) and Written Opinion (WO). Provided by European Patent Office. dated Sep. 1, 2015. pp. 1-8.
PCT/IB2014/003184. Written Opinion (WO). Provided by State Intellectual Property Office of the P.R. China. dated Aug. 27, 2015. pp. 1-4.
PCT/IB2014/003262. International Search Report (ISR) and Written Opinion (WO). Provided by State Intellectual Property Office of the P.R.China. dated Sep. 23, 2015. pp. 1-8.
PCT/IB2014/003169. International Search Report (ISR) and Written Opinion (WO). Provided by State Intellectual Property Office of the P.R.China. dated Jul. 30, 2015. pp. 1-7.
PCT/IB2014/003173. International Search Report (ISR) and Written Opinion (WO). Provided by State Intellectual Property Office of the P.R.China. dated Sep. 9, 2015. pp. 1-9.
PCT/IB2014/003265. International Search Report (ISR) and Written Opinion (WO). Provided by State Intellectual Property Office of the P.R.China. dated Sep. 24, 2015. pp. 1-9.
PCT/IB2014/003171. International Search Report (ISR) and Written Opinion (WO). Provided by State Intellectual Property Office of the P.R.China. dated Sep. 9, 2015. pp. 1-8.
PCT/IB2014/003170. International Search Report (ISR) and Written Opinion (WO). Provided by State Intellectual Property Office of the P.R.China. dated Sep. 9, 2015. pp. 1-9.

\* cited by examiner

MULTI-CORE PROCESSOR WITH NON-CORE COMMON RESOURCES

POWER SAVING MECHANISM FOR LOADS FROM NON-CORE RESOURCES

EXEMPLARY CORE STAGES FOR LOAD REPLAY REDUCTION

MECHANISM TO PRECLUDE SHARED RAM-DEPENDENT LOAD REPLAYS IN AN OUT-OF-ORDER PROCESSOR

CROSS-REFERENCE TO RELATED APPLICATIONS

This application is a continuation of U.S. patent application Ser. No. 14/889,270, filed on Nov. 5, 2015, which is herein incorporated by reference for all intents and purposes.

This application is related to the following co-pending Patent Applications, each of which has a common assignee and common inventors.

| Serial Number | Filing Date | Title |
| --- | --- | --- |
| U.S. Pat. No. 14,889,178 | Nov. 5, 2015 | MECHANISM TO PRECLUDE LOAD REPLAYS DEPENDENT ON FUSE ARRAY ACCESS IN AN OUT-OF-ORDER PROCESSOR |
| U.S. Pat. No. 14,950,283 | Nov. 24, 2015 | MECHANISM TO PRECLUDE LOAD REPLAYS DEPENDENT ON FUSE ARRAY ACCESS IN AN OUT-OF-ORDER PROCESSOR |
| U.S. Pat. No. 14,889,199 | Nov. 5, 2015 | MECHANISM TO PRECLUDE I/O-DEPENDENT LOAD REPLAYS IN AN OUT-OF-ORDER PROCESSOR |
| U.S. Pat. No. 14,950,306 | Nov. 24, 2015 | MECHANISM TO PRECLUDE I/O-DEPENDENT LOAD REPLAYS IN AN OUT-OF-ORDER PROCESSOR |
| U.S. Pat. No. 14,889,214 | Nov. 5, 2015 | MECHANISM TO PRECLUDE UNCACHEABLE-DEPENDENT LOAD REPLAYS IN OUT-OF-ORDER PROCESSOR |
| U.S. Pat. No. 14,950,331 | Nov. 24, 2015 | MECHANISM TO PRECLUDE UNCACHEABLE-DEPENDENT LOAD REPLAYS IN OUT-OF-ORDER PROCESSOR |
| U.S. Pat. No. 14,889,223 | Nov. 5, 2015 | LOAD REPLAY PRECLUDING MECHANISM |
| U.S. Pat. No. 14,950,365 | Nov. 24, 2015 | LOAD REPLAY PRECLUDING MECHANISM |
| U.S. Pat. No. 14,889,229 | Nov. 5, 2015 | MECHANISM TO PRECLUDE LOAD REPLAYS DEPENDENT ON PAGE WALKS IN AN OUT-OF-ORDER PROCESSOR |
| U.S. Pat. No. 14,950,396 | Nov. 24, 2015 | MECHANISM TO PRECLUDE LOAD REPLAYS DEPENDENT ON PAGE WALKS IN AN OUT-OF-ORDER PROCESSOR |
| U.S. Pat. No. 14,889,243 | Nov. 5, 2015 | MECHANISM TO PRECLUDE LOAD REPLAYS DEPENDENT ON LONG LOAD CYCLES IN AN OUT-OF-ORDER PROCESSOR |
| U.S. Pat. No. 14,950,415 | Nov. 24, 2015 | MECHANISM TO PRECLUDE LOAD REPLAYS DEPENDENT ON LONG LOAD CYCLES IN AN OUT-OF-ORDER PROCESSOR |
| U.S. Pat. No. 14,889,253 | Nov. 5, 2015 | PROGRAMMABLE LOAD REPLAY PRECLUDING MECHANISM |
| U.S. Pat. No. 14,950,439 | Nov. 24, 2015 | PROGRAMMABLE LOAD REPLAY PRECLUDING MECHANISM |
| U.S. Pat. No. 14,889,261 | Nov. 5, 2015 | POWER SAVING MECHANISM TO REDUCE LOAD REPLAYS IN OUT-OF-ORDER PROCESSOR |
| U.S. Pat. No. 14,950,528 | Nov. 24, 2015 | POWER SAVING MECHANISM TO REDUCE LOAD REPLAYS IN OUT-OF-ORDER PROCESSOR |
| U.S. Pat. No. 14,889,270 | Nov. 5, 2015 | MECHANISM TO PRECLUDE SHARED RAM-DEPENDENT LOAD REPLAYS IN AN OUT-OF-ORDER PROCESSOR |
| U.S. Pat. No. 14,889,281 | Nov. 5, 2015 | APPARATUS AND METHOD TO PRECLUDE NON-CORE CACHE-DEPENDENT LOAD REPLAYS IN AN OUT-OF-ORDER PROCESSOR |
| U.S. Pat. No. 14,950,582 | Nov. 24, 2015 | APPARATUS AND METHOD TO PRECLUDE NON-CORE CACHE-DEPENDENT LOAD REPLAYS IN AN OUT-OF-ORDER PROCESSOR |
| U.S. Pat. No. 14,889,306 | Nov. 5, 2015 | MECHANISM TO PRECLUDE LOAD REPLAYS DEPENDENT ON OFF-DIE CONTROL ELEMENT ACCESS IN AN OUT-OF-ORDER PROCESSOR |
| U.S. Pat. No. 14950,615 | Nov. 24, 2015 | MECHANISM TO PRECLUDE LOAD REPLAYS DEPENDENT ON OFF-DIE CONTROL ELEMENT ACCESS IN AN OUT-OF-ORDER PROCESSOR |
| U.S. Pat. No. 14,889,325 | Nov. 5, 2015 | APPARATUS AND METHOD TO PRECLUDE X86 SPECIAL BUS CYCLE LOAD REPLAYS IN AN OUT-OF-ORDER PROCESSOR |
| U.S. Pat. No. 14,950,642 | Nov. 24, 2015 | APPARATUS AND METHOD TO PRECLUDE X86 SPECIAL BUS CYCLE LOAD REPLAYS IN AN OUT-OF-ORDER PROCESSOR |
| U.S. Pat. No. 14,889,339 | Nov. 5, 2015 | APPARATUS AND METHOD TO PRECLUDE LOAD REPLAYS DEPENDENT ON WRITE COMBINING MEMORY SPACE ACCESS IN AN OUT-OF-ORDER PROCESSOR |

-continued

| Serial Number | Filing Date | Title |
|---|---|---|
| U.S. Pat. No. 14,950,684 | Nov. 24, 2015 | APPARATUS AND METHOD TO PRECLUDE LOAD REPLAYS DEPENDENT ON WRITE COMBINING MEMORY SPACE ACCESS IN AN OUT-OF-ORDER PROCESSOR |
| U.S. Pat. No. 14,889,358 | Nov. 5, 2015 | APPARATUS AND METHOD FOR PROGRAMMABLE LOAD REPLAY PRECLUSION |
| U.S. Pat. No. 14,950,713 | Nov. 24, 2015 | APPARATUS AND METHOD FOR PROGRAMMABLE LOAD REPLAY PRECLUSION |

BACKGROUND OF THE INVENTION

Field of the Invention

This invention relates in general to the field of microelectronics, and more particularly to a power saving mechanism to reduce load replays in an out-of-order processor.

Description of the Related Art

Integrated device technologies have exponentially advanced over the past 40 years. More specifically directed to the microprocessor fields, starting with 4-bit, single instruction, 10-micrometer devices, the advances in semiconductor fabrication technologies have enabled designers to provide increasingly more complex devices in terms of architecture and density. In the 80's and 90's so-called pipeline microprocessors and superscalar microprocessors were developed comprising millions of transistors on a single die. And now 20 years later, 64-bit, 32-nanometer devices are being produced that have billions of transistors on a single die and which comprise multiple microprocessor cores for the processing of data.

In addition to the employment of instruction parallelism in present day multi-core processors, out-of-order execution mechanisms are also prevalent. According to out-of-order execution principles, instructions are queued in reservation stations for execution by execution units, and only those instructions that are waiting on an operand as a result of the execution of older instructions are held up in the reservation stations; instructions that are not waiting on operands are dispatched for execution. Following execution, results are queued and put back into registers in proper order, typically in a processor stage called a retire state. Hence, the instructions are executed out of the original program order.

Out-of-order execution provides for significant throughput improvement since execution units, which would otherwise be sitting idle, are employed to execute younger instructions while older instructions await their operands. Though, as one skilled in the art will appreciate, instructions don't always execute successfully and, as a result, when a given instruction does not execute successfully, that instruction and all instructions that are younger than that instruction must be executed again. This concept is known as "replay," because mechanisms in present day processors essentially stop current execution, back up the machine state to the point just prior to when the instruction executed unsuccessfully, and replay the unsuccessfully executed instruction along with all younger instructions, which may or may not have been dispatched prior to dispatch of the unsuccessfully executed instruction.

Replay, however, is an exceptional case, and the performance impacts of replays is very often negligible. Yet, the performance impact of holding instructions in reservation stations until their operands are available is significant, and microprocessor designers have developed acceleration techniques that allow certain instructions to be dispatched when there is a high probability that their operands will become available just prior to execution. Not only are these certain instructions dispatched, but mechanisms are put in place to provide their required operands just in time.

This application addresses one such acceleration technique where younger instructions that require an operand that is assumed with a high probability to be resident in an on-core cache memory are dispatched following a specified number of clock cycles after dispatch of a load instruction whose execution leads to retrieval of the operand from the cache. Accordingly, when the load instruction is dispatched, the younger instructions that are waiting on its operand are stalled in their respective reservation stations until the specified number of clock cycles have transpired, and then the younger instructions are dispatched for execution with high certainty that their required operand will become available.

The performance improvement resulting from utilization of the above noted acceleration technique is so substantial that microprocessor architects typically apply the techniques across the board to all load instructions (e.g., loads from I/O, uncacheable loads, loads from interrupt registers, special loads, etc.), even though it is certain that there are a number of load instructions that will take longer than the specified number of cycles to obtain their operand, thus requiring a replay of all younger instructions that were dispatched in anticipation that the operand would be available. The performance improvements resulting from this load acceleration technique more than offset the performance penalties incurred by infrequent replays.

But as multi-core processor technologies continue to advance, designers are now finding that certain processor resources, such as level 2 (L2) caches, interrupt controllers, fuse arrays, etc., which are infrequently accessed, are better suited for placement in a common area of a multi-core processor die rather than being replicated within each of the cores. Hence, resources such as those noted above, are shared by the processor cores. As one skilled in the art will appreciate, to load an operand from an off-core resource (say, a fuse array) takes substantially longer than is required to load from an on-core resource (say, an L1 cache). And even though the performance penalty that is incurred as a consequence of having to perform replays of younger instructions that were dispatched under the above acceleration technique is not substantial, it has been observed by the present inventors that the power utilization impact is notable, for a remarkable number of instructions are being executed under conditions where it virtually certain that they will be replayed. And the initial execution of these instructions essentially wastes power, thus being disadvantageous from the standpoints of battery life, thermal profile, and reliability.

Therefore, what is needed is an apparatus and method that enables power to be saved in a processor by reducing the number of replays that are required.

In addition, what is needed is a load replay reduction mechanism in an out-of-order processor that results in power savings for the processor.

SUMMARY OF THE INVENTION

The present invention, among other applications, is directed to solving the above-noted problems and addresses other problems, disadvantages, and limitations of the prior art.

One aspect of the present invention contemplates an apparatus for reducing replays in an out-of-order processor. The apparatus includes a first reservation station and a second reservation station. The first reservation station is configured to dispatch a first load micro instruction, and is configured to detect and indicate on a hold bus if the first load micro instruction is a specified load micro instruction directed to retrieve an operand from a prescribed resource other than on-core cache memory. The second reservation station is coupled to the hold bus, and is configured to dispatch one or more younger micro instructions therein that depend on the first load micro instruction for execution after a first number of clock cycles following dispatch of the first load micro instruction, and if it is indicated on the hold bus that the first load micro instruction is the specified load micro instruction, the second reservation station is configured to stall dispatch of the one or more younger micro instructions until the first load micro instruction has retrieved the operand. The plurality of non-core resources includes a random access memory, configured to store microcode patches corresponding to the out-of-order processor which, upon initialization, accesses the random access memory to retrieve the microcode patches.

Another aspect of the present invention comprehends an apparatus for reducing replays. The apparatus includes a multi-core processor, that has a plurality of cores. Each of the plurality of cores includes a first reservation station and a second reservation station. The first reservation station is configured to dispatch a first load micro instruction, and is configured to detect and indicate on a hold bus if the first load micro instruction is a specified load micro instruction directed to retrieve an operand from a prescribed resource other than on-core cache memory. The second reservation station is coupled to the hold bus, and is configured to dispatch one or more younger micro instructions therein that depend on the first load micro instruction for execution after a first number of clock cycles following dispatch of the first load micro instruction, and if it is indicated on the hold bus that the first load micro instruction is the specified load micro instruction, the second reservation station is configured to stall dispatch of the one or more younger micro instructions until the first load micro instruction has retrieved the operand. The plurality of non-core resources includes a random access memory, configured to store microcode patches corresponding to the multi-core processor which, upon initialization, accesses the random access memory to retrieve the microcode patches.

A further aspect of the present invention considers a method for reducing replays in an out-of-order processor. The method includes: disposing a plurality of non-core resources, comprising a random access memory, configured to store microcode patches corresponding to the out-of-order processor; upon initialization, accessing the random access memory to retrieve the microcode patches; via a first reservation station, dispatching a first load micro instruction, and detecting and indicating on a hold bus if the first load micro instruction is a specified load micro instruction directed to retrieve an operand from a prescribed resource other than on-core cache memory; and via a second reservation station that is coupled to the hold bus, dispatching one or more younger micro instructions therein that depend on the first load micro instruction for execution after a first number of clock cycles following dispatch of the first load micro instruction, and if it is indicated on the hold bus that the first load micro instruction is the specified load micro instruction, stalling dispatch of the one or more younger micro instructions until the first load micro instruction has retrieved the operand.

Regarding industrial applicability, the present invention is implemented within a MICROPROCESSOR which may be used in a general purpose or special purpose computing device.

BRIEF DESCRIPTION OF THE DRAWINGS

These and other objects, features, and advantages of the present invention will become better understood with regard to the following description, and accompanying drawings where.

DETAILED DESCRIPTION

Figure 1:
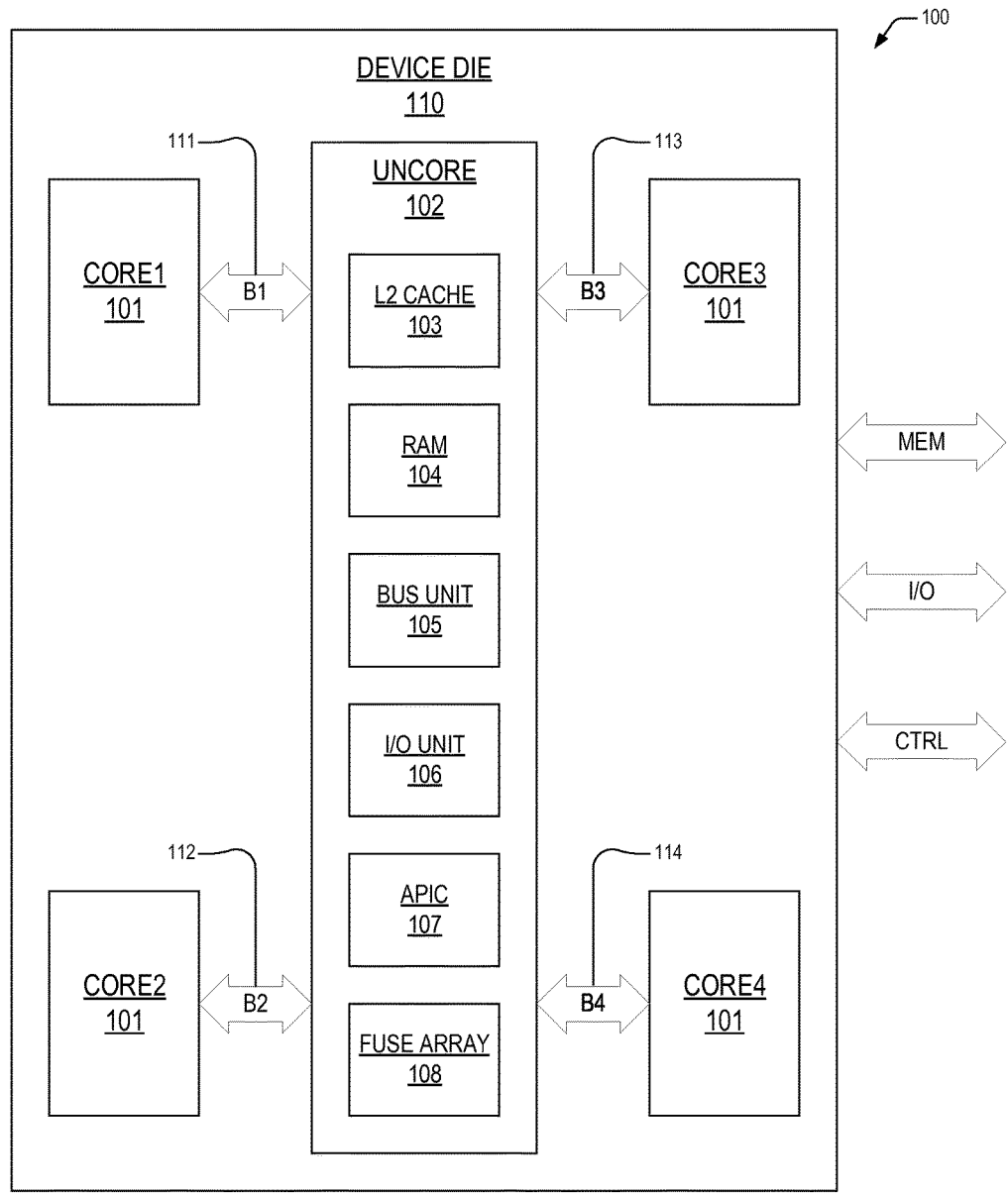
FIG. 1 is a block diagram illustrating a present day multi-core processor that utilizes common resources disposed external to each of the cores.

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase.

Definitions

Integrated Circuit (IC): A set of electronic circuits fabricated on a small piece of semiconductor material, typically silicon. An IC is also referred to as a chip, a microchip, or a die.

Central Processing Unit (CPU): The electronic circuits (i.e., "hardware") that execute the instructions of a computer program (also known as a "computer application" or "application") by performing operations on data that include arithmetic operations, logical operations, and input/output operations.

Microprocessor: An electronic device that functions as a CPU on a single integrated circuit. A microprocessor receives digital data as input, processes the data according to instructions fetched from a memory (either on-die or off-die), and generates results of operations prescribed by the instructions as output. A general purpose microprocessor may be employed in a desktop, mobile, or tablet computer, and is employed for uses such as computation, text editing, multimedia display, and Internet browsing. A microprocessor may also be disposed in an embedded system to control a wide variety of devices including appliances, mobile telephones, smart phones, and industrial control devices.

Multi-Core Processor: Also known as a multi-core microprocessor, a multi-core processor is a microprocessor having multiple CPUs ("cores") fabricated on a single integrated circuit.

Instruction Set Architecture (ISA) or Instruction Set: A part of a computer architecture related to programming that includes data types, instructions, registers, addressing modes, memory architecture, interrupt and exception handling, and input/output. An ISA includes a specification of the set of opcodes (i.e., machine language instructions), and the native commands implemented by a particular CPU.

x86-Compatible Microprocessor: A microprocessor capable of executing computer applications that are programmed according to the x86 ISA.

Microcode: A term employed to refer to a plurality of micro instructions. A micro instruction (also referred to as a "native instruction") is an instruction at the level that a microprocessor sub-unit executes. Exemplary sub-units include integer units, floating point units, multimedia (MMX) units, and load/store units. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a sub-unit or sub-units within the CISC microprocessor.

Fuse: A conductive structure typically arranged as a filament which can be broken at select locations by applying a voltage across the filament and/or current through the filament. Fuses may be deposited at specified areas across a die topography using well known fabrication techniques to produce filaments at all potential programmable areas. A fuse structure is blown (or unblown) subsequent to fabrication to provide for desired programmability of a corresponding device disposed on the die.

Figure 2:
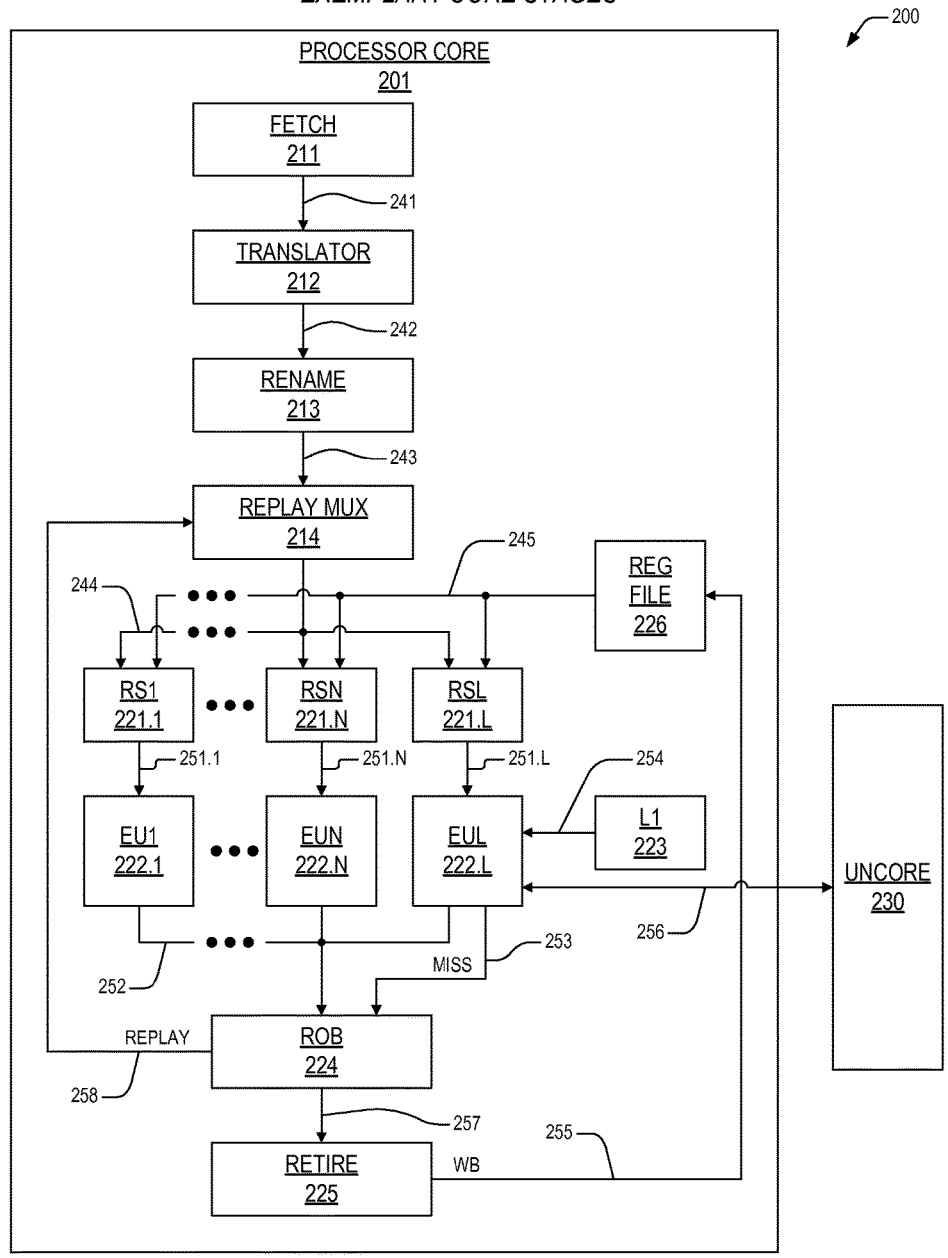
FIG. 2 is a block diagram depicting exemplary core stages in each of the present day cores of FIG. 1.

In view of the above background discussion on load mechanisms in multi-core processors and associated techniques employed within present day multi-core processors to perform load operations from non-core resources, a discussion of the limitations and disadvantages of those present day techniques will be presented with reference to FIGS. 1-2. Following this, a discussion of the present invention will be presented with reference to FIGS. 3-7.

Turning to FIG. 1, a block diagram 100 is presented illustrating a present day multi-core processor that utilizes common resources disposed external to each of the cores 101. The diagram 100 depicts a device die 110, upon which is disposed four processor cores 101. The present inventors note that for purposes of clarity, a quad-core (i.e., four cores 101) multi-core microprocessor will be described herein, however, the principles and features of the present invention may be applied to multi-core microprocessors having different numbers of cores 101.

As one skilled in the art will appreciate, for design and/or business related reasons, architects may choose to share certain processor resources among the cores 101. For performance motives, these shared resources are typically disposed on the same die 110 as the cores 101, and they are accessed by each of the cores 101 via high speed busses 111-114. Accordingly, the diagram 100 shows exemplary shared resources such as an L2 cache 103, random access memory (RAM) 104, a bus unit 105, an input/output unit 106, an advanced programmable interrupt controller (APIC) 107, and a fuse array 108. In aggregation, these shared resources 103-108 that are disposed on the same die 110 as the cores 101, yet which are external to the cores 101, will be henceforth referred to as uncore resources 102. Thus, bus B1 111 enables CORE1 101 access to the uncore 102. Bus B2 112 enables CORE2 101 access to the uncore 102. Bus B3 113 enables CORE3 101 access to the uncore 102. And bus B4 114 enables CORE4 101 access to the uncore 102. In a typical configuration, the multi-core processor is coupled to other elements external to the device die 110 such as system memory (accessed via a memory bus MEM), input/output elements (accessed via bus I/O), and system control elements (accessed via bus CTRL).

In operation, each of the cores 101, under operating system control, may execute associated instructions that are fetched from system memory, and will perform operations on operands that correspond to intended application. One or more of the cores 101 may require access to one or more of the uncore resources 102 and will access the one or more of the uncore resources 102 in a controlled manner via a corresponding bus B1-B4. For example, during power initialization, one or more of the cores 101 may perform a load operation from the fuse array 108 to retrieve configuration parameters, or may perform a load from the RAM 104 to retrieve patch information. During normal operation, the cores 101 may access the L2 cache 103 to read/write memory operands that are not present in on-core caches (e.g., L1 caches). The cores 101 may access the bus unit 105 to read/write from/to system memory, or may utilize the I/O unit 106 to perform I/O operations via the I/O bus. The cores 101 may furthermore access the APIC 107 to perform interrupt operations.

Now referring to FIG. 2, a block diagram is presented depicting exemplary core stages in each of the present day cores 101 of FIG. 1. The diagram shows a processor core 201 that is disposed on the die 110. The core 201 includes a fetch stage 211 that is coupled to a translator stage 212 via bus 241. The translator stage 212 is coupled to a rename stage 213 via bus 242. The rename stage 213 is coupled to a replay mux stage 214 via bus 243. The replay mux 214 is coupled to a plurality of reservation stations RS1-RSN 221.1-221.N and a load reservation station RSL 221.L via reservation bus 244. Each of the reservation stations RS1-RSN, RSL is coupled to a corresponding execution unit EU1-EUN 222.1-222.N, EUL 222.L via a corresponding dispatch bus 252.1-251.N, 251.L. The reservation stations RS1-RSN, RSL are coupled to a register file 226 via register bus 245.

The present inventors note that, outside of execution unit EUL, the remaining execution units EU1-EUN may comprise units typical to present day superscalar processors such as integer units, floating point units, multimedia units, and store units. Of particular interest to the present application is execution unit EUL, which is depicted as a load unit 222.L whose primary function is to load operands from a variety of resources such as system memory, system I/O, and uncore resources 230, as are described above with reference to FIG. 1.

Accordingly, the load unit EUL is coupled to an L1 cache 223 via bus 254 and to the uncore 230 via bus 256. For most memory operands, the load unit 222.L first accesses an L1 cache 223. If the load misses in the L1 cache 223, then the load unit 222.L must access the L2 cache in the uncore 230. The execution units EU1-EUN, EUL are also coupled to a reorder buffer 224 via bus 252. Additionally, the load unit EUL is coupled to the reorder buffer 224 via bus MISS 253. The reorder buffer 224 is coupled to the replay mux 214 via bus REPLAY 258 and to a retire unit 225 via bus 257. The retire unit 225 is coupled to the register file 226 via a writeback WB bus 255.

It is noted that the core stages shown in FIG. 2 are merely exemplary of a present day superscalar, or "out-of-order" processor core 201, and are presented for purposes of clearly teaching the present invention. As one skilled in the art will appreciate, processor core stages may vary according to architecture and intended application.

In operation, program instructions (not shown) are fetched from memory by the fetch unit 211. In an x86-compatible processor core 201, these program instructions comport with the x86 ISA. The program instructions are provided, in order, to the translator 212 on bus 241. The translator 212 translates the program instructions into one or more micro instructions that direct sub-operations in corresponding execution units EU1-EUN, EUL in order to perform the operations specified by the program instructions. The micro instructions are then provided to the rename unit 213 on bus 242, where architectural registers (i.e., operand register locations) specified in some of the micro instructions are remapped to hardware registers (not shown) in the processor core 201 in order to increase execution parallelism for independent micro instruction streams. The rename unit 213 also tags each of the micro instructions according to serial program order, and source and destination operand fields in the micro instructions are also tagged with the tags of the younger micro instructions upon which one or more of their operands depend. The renamed micro instructions are then provided to the replay mux 214 on bus 243.

The replay mux 214 performs several functions in an out-of-order processor core 201. Primarily, the mux 214 reads the opcodes in each of the renamed micro instructions to determine an appropriate execution unit EU1-EUN, EUL for execution. For example, renamed integer micro instructions may be executed by, say, EU1. Floating point micro instructions may be executed by EU2. And etc. And of particular interest to the present application, renamed load micro instructions may be executed by the load execution unit EUL. Thus, the replay mux 214 provides one or more renamed micro instructions to one or more of the reservation stations RS1-RSN1, RSL to await dispatch to a corresponding execution unit EU1-EUN, EUL.

Each of the reservation stations RS1-RSN, RSL accesses the register file 226 to read operands required by their renamed micro instructions queued for operation therein. Renamed micro instructions that are not tagged with the tags of older renamed micro instructions (i.e., the renamed micro instructions are not dependent on the older renamed micro instructions) are immediately dispatched to corresponding execution units EU1-EUN, EUL for execution. Dependent renamed micro instructions (i.e., renamed micro instructions that include tags of older renamed micro instructions which have not yet completed execution) are generally held up by the reservation stations RS1-RSN, RSL until such time as their tagged dependent operands are available. When the tagged dependent operands are available, they are provided to the dependent renamed micro instructions, and the micro instructions are dispatched to corresponding execution units EU1-EUN, EUL for execution. The execution units EU1-EUN, EUL may also perform a power saving function when they are not executing micro instructions. Generally, clocks internal to the execution units EU1-EUN, EUL are shut down when they are not executing micro instructions, which saves substantial power.

Renamed micro instructions and their results are provided to the reorder buffer 224 via bus 252. The reorder buffer places all results from out-of-order execution of the renamed micro instructions back into program order. That is, results from renamed programmed registers are remapped back to their corresponding architectural registers and the results are queued for entry in the architectural registers according to the specified program order of execution. Micro instructions that have successfully completed execution with proper results are provided to the retire unit 225 on bus 257. The results of these retired micro instructions are written back to the register file 226 on the WB bus 255.

As one skilled in the art will appreciate, there are a number of conditions that may cause a renamed micro instruction to execute unsuccessfully such as, but not limited to, program exceptions, general interrupts, I/O interrupts, branch exceptions, and the like. When the reorder buffer determines that a renamed micro instruction has not executed successfully, then it must be re-executed ("replayed") along with all younger renamed micro instructions that have been dispatched for execution. Accordingly, the reorder buffer 224 initiates a replay event by providing the tag of the unsuccessfully executed renamed micro instruction on the replay bus 258.

When an unsuccessfully executed renamed micro instruction tag is provided to the replay mux 214, the replay mux 214 in response backs up machine state to comport with execution of renamed micro instructions beginning at the renamed micro instruction whose tag was provided on REPLAY 258.

One skilled in the art will also appreciate that in order to improve performance, microprocessor designers often make assumptions regarding how instructions will execute. For example, it is well known in the art that a significant percentage of branches will not be taken. Thus, the fetch unit 211 may be configured to queue up instructions for execution according to that assumption. If a branch is not taken, then overall execution speed is improved. If the branch is taken, then all instructions older than the branch must be replaced with instructions from the taken program path.

Another assumption that microprocessor designers make is that a load micro instruction will hit in the L1 cache 223 in a specified number of clock cycles, and this assumption is based upon L1 cache hit statistics, say 90 percent hit rate, along with the number of clock cycles required according to design to access the L1 cache 223. For purposes of the present application, consider that it will take four clock cycles to access the L1 cache 223, however, such a number is chosen for instructional purposes. Other numbers of clock cycles are contemplated.

Accordingly, a reservation station RS1-RSN may comprise logic that stalls renamed micro instructions whose tags correspond with an older load micro instruction until four clock cycles after dispatch of the older load instruction, and then dispatches the renamed micro instructions to their corresponding execution units EU1-EUN under the assumption that the older load micro instruction will hit in the L1 cache 223 within the four clock cycles and the tagged operand will be ready. Though not shown in FIG. 2, it is noted that the execution units EU1-EUN, EUL may also access operands made available from load operations and provide these operands to micro instructions currently under execution. For loads that hit in the L1 cache 223, the operands are provided to the dispatched dependent younger micro instructions, which execute through completion much faster than would otherwise be provided for. But for loads that miss in the L1 cache (approximately 10 percent of the time according to a 90 percent hit rate assumption), after successful completion of the loads, all dependent younger micro instructions that were dispatched under the assumption of a hit must be replayed. Thus, upon a miss in the L1 cache 232, the load execution unit EUL will inform the reorder buffer 224 of such by indicating the tag of the missed load instruction on bus MISS 253 to initiate the replay of the younger dependent instructions.

Such a scheme is incredibly effective from a performance standpoint, for most present day caches 223 are very efficient, and thus it is a common practice to stall all micro instructions that depend from a load micro instruction for a number of clock cycles after dispatch of the load instruction based on a presumed cache access number of clock cycles (e.g., four clock cycles). The dependent micro instructions are stalled in their respective reservation station RS1-RSN, and then dispatched when it is assumed that the operands specified in the load micro instruction are available from the L1 cache 223. Typically, this acceleration scheme is utilized for all load instructions, including load instructions that access resources other than the L1 cache 223. Because these types of load instructions are relatively infrequent compared to memory load instructions, the performance impact associated with replay of load instructions that access resources other than memory is generally tolerated. As such, when a load micro instruction takes longer than a specified number of clock cycles (four clock cycles in this example) to successfully execute (i.e., to "resolve"), then the load execution unit EUL will declare a miss on bus MISS, thus causing dependent younger micro instructions to be replayed after completion of the load.

The above technique has served well to improve the performance of superscalar processors 201 over the past several years, but the present inventors have observed that additional challenges are presented when this scheme is adapted to a multi-core processor configuration, such as is shown in FIG. 1. More specifically, such as scheme, while extremely effective in configurations dominated by access to an L1 cache 223, is not very power efficient when applied to a multi-core processor configuration that increasingly utilizes accesses to uncore resources 230, for access times to uncore resources 230 are very slow when compared to those of a present day L1 cache 223.

What this means is that any load micro instruction that is specifically directed to an uncore resource 230 such as the fuse array 108, the bus unit 105 (for uncacheable loads), the APIC 107, the I/O unit 106, and perhaps the L2 cache 103 and RAM 104, will result in replays of dependent younger micro instructions having the tags of those loads from the uncore resources 230. And the present inventors have observed that, while not much of a performance hit, the wasted initial executions of these dependent younger micro instructions result in power expenditures that are significant, because load micro instructions—which are guaranteed to be replayed—are being dispatched to execution units EU1-EUN, thus utilizing power that would otherwise be saved by power management mechanisms therein.

The present invention overcomes the above noted limitations of present day load mechanisms, and others, by providing an apparatus and method for saving power in an out-of-order multi-core processor by reducing the number of load replays according to a novel scheme, which will now be discussed with reference to FIGS. 3-7.

Figure 3:
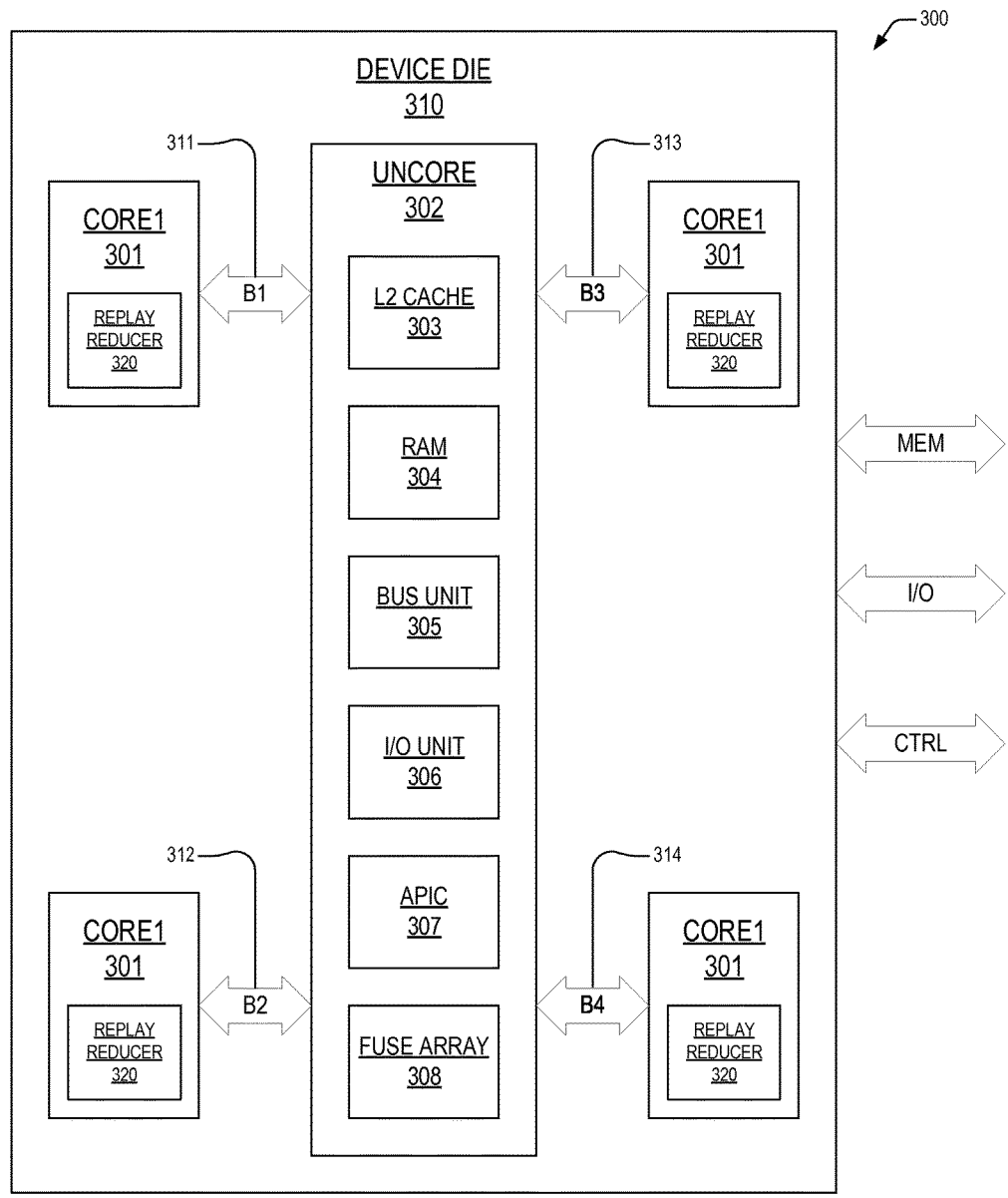
FIG. 3 is a block diagram featuring a multi-core processor according to the present invention that has a power saving mechanism for loads from non-core resources.

Referring now to FIG. 3, a block diagram 300 is presented featuring a multi-core processor according to the present invention that has a power saving mechanism for loads from non-core resources. The diagram 300 depicts a device die 310, upon which is disposed four processor cores 301. It is noted that four cores 301 are shown only for purposes of clearly teaching the present invention, and the principles and details discussed below can be applied to processors having any number of cores 301 where access times for certain load operations from non-core resources are longer than those for on-core cache access.

Like the multi-core processor of FIG. 1, the multi-core processor according to the present invention may uncore resources 302 that are typically disposed on the same die 310 as the cores 301, and they are accessed by each of the cores 301 via high speed busses 311-314. Accordingly, the diagram 300 shows exemplary shared resources such as, but not limited to, an L2 cache 303, random access memory (RAM) 304, a bus unit 305, an input/output unit 306, an APIC 307, and a fuse array 308. Thus, bus B1 311 enables CORE1 301 access to the uncore 302. Bus B2 312 enables CORE2 301 access to the uncore 302. Bus B3 313 enables CORE3 301 access to the uncore 302. And bus B4 314 enables CORE4 301 access to the uncore 302. In a typical configuration, the multi-core processor is coupled to other elements (not shown) external to the device die 310 such as, but not limited to, system memory (accessed via a memory bus MEM), input/output elements (accessed via bus I/O), and system control elements (accessed via bus CTRL). The control elements may include, but are not limited to, a Peripheral Component Interconnect Express (PCI-e) element, a Peripheral Component Interconnect (PCI) element, a Universal Serial Bus (USB) element, a graphics adaptor, a co-processor, and an inter-processor communications element.

In contrast to the multi-core processor of FIG. 1, the multi-core processor according to the present invention includes a replay reducer element 320 within each of the cores 301. In one embodiment, the replay reducer 320 is configured to detect loads that are directed to resources other than on-core cache memory (not shown), to stall all younger dependent micro instructions from being dispatched until the loads resolve, and to preclude assertion of any indications that would otherwise result in a replay event. Thus, one or more execution units (not shown) within the cores 301 may enter into a power management mode as a result of stalling dispatch of the younger dependent micro instructions, thus saving power on the die 310 which would otherwise be wasted.

In operation, each of the cores 301, under operating system control, may execute associated instructions that are fetched from system memory, and will perform operations on operands that correspond to intended application. One or more of the cores 301 may require access to one or more of the uncore resources 302 and will access the one or more of the uncore resources 302 in a controlled manner via a corresponding bus B1-B4. For example, during power initialization, one or more of the cores 301 may perform a load operation from the fuse array 308 to retrieve configuration parameters, or may perform a load from the RAM 304 to retrieve microcode patches and/or other configuration information. During normal operation, the cores 301 may access the L2 cache 303 to read/write memory operands which may have been cached from the system memory that are not present in on-core caches (e.g., L1 caches). The cores 301 may access the bus unit 305 to read/write from/to system memory, or may utilize the I/O unit 306 to perform I/O operations via the I/O bus. The cores 302 may access the bus unit 305 to read/write control data from/to the control elements. The cores 301 may furthermore access the APIC 307 to perform interrupt operations.

Rather than automatically declaring a miss as a result of these loads from uncore 302, resulting in replay of dependent younger micro instruction streams, the replay reducer 320 will stall execution of the dependent younger micro instruction streams until the loads resolve, thus enabling execution unit power management functions to be utilized. In one embodiment, the replay reducer 320 may also detect other types of loads that are not specifically directed to uncore resources 302, but which are guaranteed to otherwise cause a miss indication. These other types of loads may include, but are not limited to, I/O loads, loads requiring a specified number of cycles, loads that are known to require a page table walk such as those associated with second level address translation (i.e., nested paging, x86 extended page table loads), loads resulting from execution of x86 special bus cycles (e.g., shutdown, halt, flush, etc.), and loads that are known to resolve to uncacheable memory space or write combining space. Other embodiments contemplate detection of any type of load operation where there is a significant probability that it will take more than the specified number of clock cycles to complete.

Figure 4:
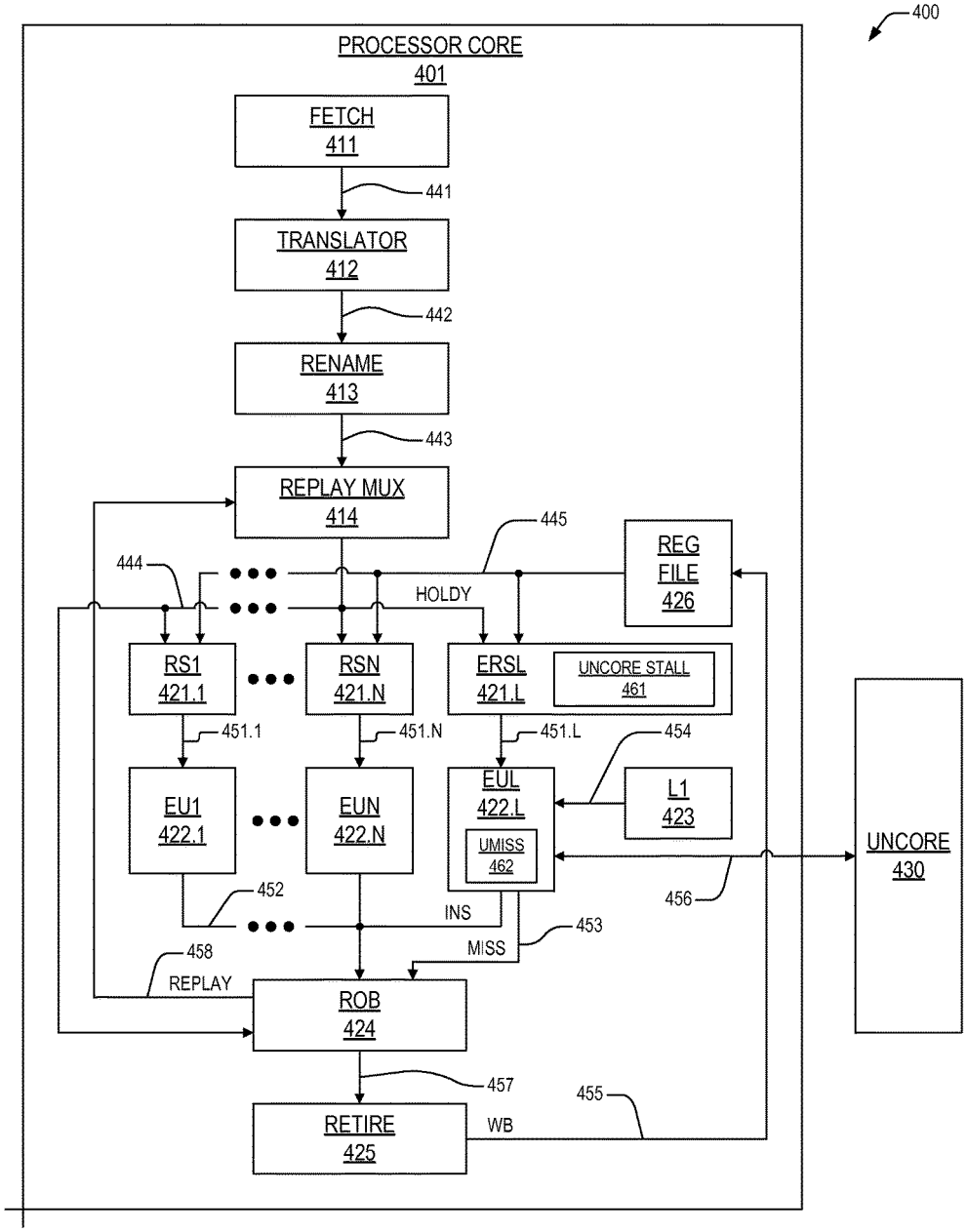
FIG. 4 is a block diagram showing exemplary cores stages in each of the cores of FIG. 3.

Turning to FIG. 4, a block diagram 400 is presented depicting exemplary core stages in each of the cores 301 of FIG. 3. The diagram shows a processor core 401 that is disposed on the die 310. The core 401 includes a fetch stage 411 that is coupled to a translator stage 412 via bus 441. The translator stage 412 is coupled to a rename stage 413 via bus 442. The rename stage 413 is coupled to a replay mux stage 414 via bus 443. The replay mux 414 is coupled to a plurality of reservation stations RS1-RSN 421.1-421.N and an enhanced load reservation station ERSL 421.L via reservation and hold bus HOLDY 444. Reservation station ERSL includes an uncore stall element 461. Each of the reservation stations RS1-RSN, ERSL is coupled to a corresponding execution unit EU1-EUN 422.1-422.N, EUL 422.L via a corresponding dispatch bus 451.1-451.N, 451.L. The reservation stations RS1-RSN, ERSL are coupled to a register file 426 via register bus 445.

Except for execution unit EUL, the remaining execution units EU1-EUN may comprise units typical to present day superscalar processors such as integer units, floating point units, multimedia units, and store units. Execution unit EUL is a load unit 422.L whose primary function is to load operands from a variety of resources including, but not limited to, system memory, system I/O, and uncore resources 430, as are described above with reference to FIG. 3. Execution unit EUL additionally comprises an unmiss element UMISS 462.

Accordingly, the load unit EUL is coupled to an L1 cache 423 via bus 454 and to the uncore 430 via bus 456. For memory operands, the load unit 422.L first accesses an L1 cache 423. If the load misses in the L1 cache 423, then the load unit 422.L must access the L2 cache (not shown) in the uncore 430. The execution units EU1-EUN, EUL are also coupled to a reorder buffer 424 via bus 452. Additionally, the load unit EUL is coupled to the reorder buffer 424 via bus MISS 453. The reorder buffer 424 is coupled to the replay mux 414 via bus REPLAY 458, to a retire unit 425 via bus 457, and to the reservation stations RS1-RSN, ERSL via the HOLDY bus 444. The retire unit 425 is coupled to the register file 426 via a writeback WB bus 455.

It is noted that the core stages shown in FIG. 4 are presented as examples in order to clearly teach aspects of the present invention, because they are exemplary of those within present day out-of-order processor cores, yet is it noted that one skilled in the art will be able to adapt aspects and features of the present invention described herein to other processor core stage configurations which may be required according to architecture and intended application.

In operation, program instructions (not shown) are fetched from memory (not shown) by the fetch unit 411. In an x86-compatible processor core 401, these program instructions comport with the x86 ISA. The program instructions are provided, in order, to the translator 412 on bus 441. The translator 412 translates the program instructions into one or more micro instructions that direct sub-operations in corresponding execution units EU1-EUN, EUL in order to perform the operations specified by the program instructions. The micro instructions are then provided to the rename unit 413 on bus 442, where architectural registers (i.e., operand register locations) specified in some of the micro instructions are remapped to hardware registers (not shown) in the processor core 401 in order to increase execution parallelism for independent micro instruction streams. The rename unit 413 also tags each of the micro instructions according to serial program order, and source and destination operand fields in the micro instructions are also tagged with the tags of the younger micro instructions upon which one or more of their operands depend. The renamed micro instructions are then provided to the replay mux 414 on bus 443.

The replay mux 414 reads the opcodes in each of the renamed micro instructions to determine an appropriate execution unit EU1-EUN, EUL for execution and, in particular, renamed load micro instructions are executed by the load execution unit EUL. Thus, the replay mux 414 thus provides one or more renamed micro instructions to one or more of the reservation stations RS1-RSN1, ERSL to await dispatch to a corresponding execution unit EU1-EUN, EUL.

Each of the reservation stations RS1-RSN, ERSL accesses the register file 426 to read operands required by their renamed micro instructions queued for operation therein. Renamed micro instructions that are not tagged with the tags of older renamed micro instructions (i.e., the renamed micro instructions are not dependent on the older renamed micro instructions) are immediately dispatched to corresponding execution units EU1-EUN, EUL for execution. Except as will be described below, dependent younger renamed micro instructions (i.e., renamed micro instructions that include tags of older renamed micro instructions which have not yet completed execution) are generally held up by the reservation stations RS1-RSN, ERSL until such time as their tagged dependent operands are available. When the tagged dependent operands are available, they are provided to the dependent younger renamed micro instructions, and the younger micro instructions are dispatched to corresponding execution units EU1-EUN, EUL for execution. The execution units EU1-EUN, EUL may also perform a power saving function when they are not executing micro instructions. Clocks internal to the execution units EU1-EUN, EUL are shut down when they are not executing micro instructions, which saves substantial power.

Renamed micro instructions and their results are provided to the reorder buffer 424 via bus 452. The reorder buffer 424 places all results from out-of-order execution of the renamed micro instructions back into program order. That is, results from renamed programmed registers are remapped back to their corresponding architectural registers and the results are queued for entry in the architectural registers according to the specified program order of execution. Micro instructions that have successfully completed execution with proper results are provided to the retire unit 425 on bus 457. The results of these retired micro instructions are written back to the register file 426 on the WB bus 455.

When the reorder buffer 424 determines that a renamed micro instruction has not executed successfully, then it must be replayed along with all younger dependent renamed micro instructions that have been dispatched for execution. Accordingly, the reorder buffer 424 initiates a replay event by providing the tag of the unsuccessfully executed renamed micro instruction on the replay bus 458.

When an unsuccessfully executed renamed micro instruction tag is provided to the replay mux 414, the replay mux 414 in response backs up machine state to comport with execution of renamed micro instructions beginning at the renamed micro instruction whose tag was provided on REPLAY 458.

Except as will be described below, the present invention comprises reservation stations RS1-RSN that are configured to stall micro instructions that depend on a younger load micro instruction therein for a specified number of clock cycles after the load micro instruction is dispatched, presuming the load micro instruction will hit in the L1 cache 423 in the specified number of clock cycles. In one embodiment, the specified number of clock cycles is four clock cycles. Other numbers of clock cycles are contemplated.

Accordingly, except as is described below, the reservation stations RS1-RSN comprise logic that stalls renamed micro instructions whose tags correspond with an older load micro instruction until four clock cycles after dispatch of the older load instruction, and then dispatches the renamed younger micro instructions to their corresponding execution units EU1-EUN under the assumption that the load micro instruction will hit in the L1 cache 423 within the four clock cycles and the tagged operand will be ready. Though not shown in FIG. 4, it is noted that the execution units EU1-EUN, EUL may also access operands made available from load operations and provide those operands to micro instructions executing therein. For loads that complete in less than the specified number of cycles, such as loads that hit in the L1 cache 423, the operands are provided to the dispatched dependent younger micro instructions, which execute through completion much faster than would otherwise be provided for. And for loads take more than the specified number of clock cycles, such as those that miss in the L1 cache, after successful completion of the loads, all dependent younger micro instructions that were dispatched under the assumption of a hit must be replayed. Thus, upon a miss in the L1 cache 423, the load execution unit EUL will inform the reorder buffer 424 of such by indicating the tag of the missed load instruction on bus MISS 453 to initiate the replay of the younger instructions.

The present invention, however, also provides for exceptions to the above acceleration scheme by including uncore stall logic 461 in the enhanced load reservation station ERSL 421.L which detects one or more load micro instruction types in order to implement power savings in one or more of the execution units EU1-EUN by stalling younger micro instructions that are dependent on micro instructions of the one or more load micro instruction types until their operands are available. The unmiss logic 462 also detects the one or more load micro instruction types in order to preclude assertion of a miss on bus MISS 453 when the micro instructions of the one or more load micro instruction types take more than the specified number of clock cycles to obtain their operands. By doing so, the micro instructions of the one or more load micro instruction types are allowed to complete execution, and replays of those younger micro instructions that are dependent on the micro instructions of the one or more micro instruction types are not required because those younger dependent micro instructions have been stalled in the reservation stations RS1-RSN. In one embodiment, the reservation stations RS1-RSN, ERSL communicate information (e.g., tags) associated with detected micro instructions of the one or more micro instruction types to each other and to the reorder buffer 424 via bus HOLDY 444 in order to initiate stalls of the younger dependent micro instructions. When the micro instructions of the one or more load micro instruction types complete execution, the reorder buffer 424 directs the reservation stations RS1-RSN to release their stalled younger dependent micro instructions for dispatch by providing tags of the micro instructions of the one or more load micro instruction types that have completed on HOLDY 444.

Advantageously, the present invention provides for effective performance related to load micro instructions corresponding to operands cached from system memory, and substantially reduces the number of replays associated with load micro instructions of the one or more micro instruction types, thus enabling the execution units EU1-EUN to enter into power savings modes as they become empty due the implemented dependency stalls.

Thus, for instance, a load micro instruction that is specifically directed to an uncore resource 430 such as the fuse array 308, the bus unit 305, the APIC 307, the I/O unit 306, the L2 cache 303 and the RAM 304, will not result in replays of younger dependent micro instructions having the tags of those loads from the uncore resources 430.

In one embodiment, the one or more load micro instruction types may include loads from specified uncore resources 430, along with other types of loads including, but not limited to, I/O loads, loads requiring a specified number of cycles, loads from system memory that are known to require a page table walk, loads resulting from execution of x86 special bus cycles (e.g., shutdown, halt, flush, etc.), loads that are known to resolve to uncacheable memory space, and loads that are known to resolve to write combining memory space. Other embodiments contemplate detection of any type of load operation where there is a significant probability that it will take more than the specified number of clock cycles to complete.

In one embodiment, the uncore stall element 461 and the unmiss element 462 may be configured upon initialization (e.g., power up or reset) of the processor core 401 according to the present invention for detection of prescribed load micro instruction types. The prescribed load micro instruction types may be read upon initialization from specified locations in the fuse array 308. In another embodiment, each of the cores 401 may be configured to detect different types of prescribed load micro instructions via programming in the fuse array 308, where types associated with each of the cores 401 may be programmed into corresponding locations in the fuse array 308. In a further embodiment, the prescribed load micro instruction types may be programmed into the RAM 304 upon power up or reset via a Joint Test Action Group (JTAG) interface (not shown) to the multi-core device 310, where the prescribed load micro instruction types are read upon subsequent initialization from specified locations in the RAM 304.

Figure 5:
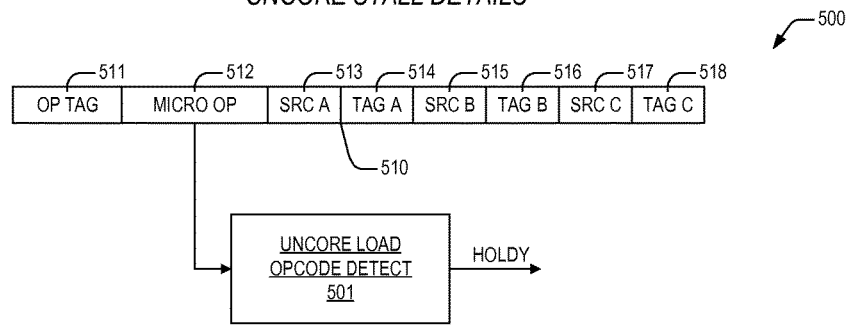
FIG. 5 is a block diagram illustrating details of the uncore stall element of FIG. 4.

Now referring to FIG. 5, a block diagram 500 is presented illustrating details of the uncore stall element 461 of FIG. 4. The stall element 461 comprises a micro instruction register 510 that is coupled to uncore load opcodes detect logic 501. The micro instruction register 510 comprises an micro instruction tag field OP TAG 511, an opcodes field MICRO OP 512, a source A field SRC A 513, a tag A field TAG A 514, a source B field SRC B 515, a tag B field TAG B 516, a source C field SRC C 517, and a tag C field TAG C 518. The detect logic 501 generates a hold signal HOLDY that is coupled to bus 444.

As one skilled in the art will appreciate, present day ISAs, such as the x86 ISA, provide for a number of different operand addressing modes including, but not limited to, direct, indirect, immediate, and relative. Consequently, one or more of the source fields SRC A-C may contain operands, one or more may specify locations of operands (including destination of result). Consequently, operation of the stall element 461 will be described in a generic sense as regards the contents of the source fields SRC A-C to allow for a broader application of the present invention to a wide number of ISAs.

Operationally, as micro instructions are provided by the replay mux 414, load micro instructions are entered into the micro instruction register 510. OP TAG has the tag of the current micro instruction in the register 510, MICRO OP has its opcodes. Contents of TAG A may contain the tag of an older micro instruction upon which contents of SRC A depend. Contents of TAG B may contain the tag of an older micro instruction upon which contents of SRC B depend. Contents of TAG C may contain the tag of an older micro instruction upon which contents of SRC C depend. The detect logic 501 is configured to read contents of MICRO OP. If MICRO OP does not contain one of the prescribed load opcodes that are described above which will cause younger micro instructions in other reservation stations RS1-RSN that depend upon the current micro instruction in the register 510 to be stalled, then the detect logic 501 deasserts HOLD Y, thus indicating to RS1-RSN that those younger micro instructions therein may be dispatched in due course. If, however, MICRO OP does contain one of the prescribed load opcodes that are described above which will cause younger micro instructions in other reservation stations RS1-RSN that depend upon the current micro instruction in the register 510 to be stalled, then the detect logic 501 asserts HOLD Y and places contents of OP TAG on bus 444, thus indicating to RS1-RSN that those younger dependent micro instructions therein must be stalled until the load prescribed by the currently micro instruction in register 510 is completed and a result of the load is provided to the younger dependent micro instructions. When the load is completed, the reorder buffer 424 will deassert HOLD Y, thus releasing the stall.

Figure 6:
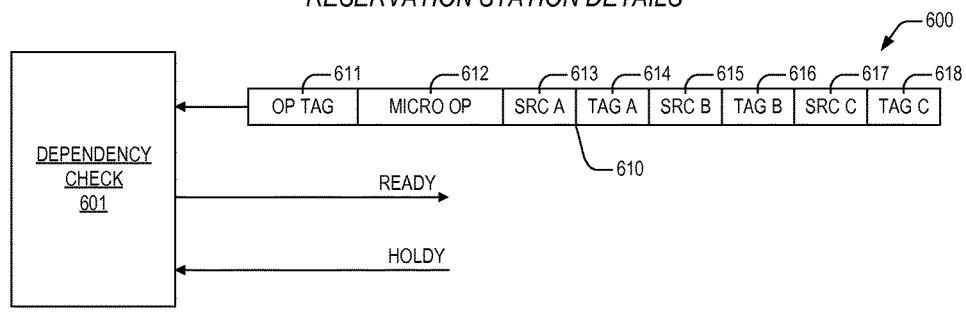
FIG. 6 is a block diagram detailing details of each of the reservation stations of FIG. 4.

Turning to FIG. 6, a block diagram is presented showing details of each of the reservation stations RS1-RSN of FIG. 4. The reservation station comprises a micro instruction register 610 that is coupled to dependency check logic 601. The micro instruction register 510 comprises an micro instruction tag field OP TAG 611, an opcodes field MICRO OP 612, a source A field SRC A 613, a tag A field TAG A 614, a source B field SRC B 615, a tag B field TAG B 616, a source C field SRC C 617, and a tag C field TAG C 618. The dependency check logic 601 generates a ready signal READY and monitors hold signal HOLDY that is coupled to bus 444.

Contents of the fields 611-618 in register 610 are the same as is described above with reference to FIG. 5 for like-named fields. The check logic 601 is additionally configured to read contents of the source tag fields TAG A-C. If contents of any of the tag fields TAG A-C match a tag that is on HOLDY when asserted, then the micro instruction within the register 610 is stalled until such time as the load micro instruction upon which the micro instruction within the register 610 depends completes, its operand obtained via the load is provided to a corresponding source field SRC A-C, and the reorder buffer 424 deasserts HOLDY. When HOLD Y is deasserted, the check logic 601 asserts READY, indicating that the micro instruction in register 610 is ready to be dispatched to its corresponding execution unit EU1-EUN.

If contents of the tag fields TAG A-C do not match a tag that is on HOLDY when asserted, then the check logic 601 asserts READY, indicating that the micro instruction in register 610 is ready to be dispatched to its corresponding execution unit EU1-EUN.

Figure 7:
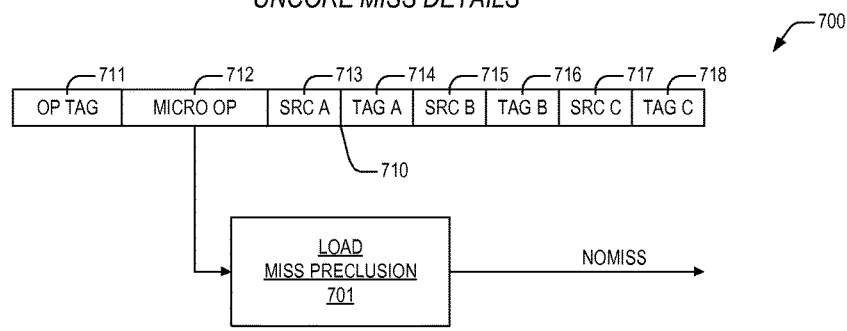
FIG. 7 is a block diagram showing details of the uncore miss element of FIG. 4.

Referring now to FIG. 7, a block diagram 700 is presented showing details of the uncore miss element 462 of FIG. 4. The uncore miss element 462 comprises a micro instruction register 710 that is coupled to load miss preclusion logic 701. The micro instruction register 710 comprises an micro instruction tag field OP TAG 711, an opcode field MICRO OP 712, a source A field SRC A 713, a tag A field TAG A 714, a source B field SRC B 715, a tag B field TAG B 716, a source C field SRC C 717, and a tag C field TAG C 718. The miss preclusion logic 501 generates a no miss signal NOMISS.

Contents of the fields 711-718 in register 710 are the same as is described above with reference to FIGS. 5-6 for like-named fields. The preclusion logic 701 is configured to read contents of MICRO OP. If MICRO OP does not contain one of the prescribed load opcodes that are described above which will cause younger dependent micro instruction to be stalled, then the load miss preclusion logic 701 deasserts signal NOMISS, which informs corresponding load execution unit EUL 422.L to manage the state of signal MISS in according to normal load instruction execution protocols. If MICRO OP contains one of the prescribed opcodes, then the preclusion logic 701 asserts NOMISS, which informs the corresponding load execution unit EUL 422.L to preclude assertion of MISS during execution of the micro instruction in register 710.

The elements described above according to the present invention are configured to perform the functions and operations as discussed herein. The present invention elements comprises logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions may be shared with other circuits, microcode, etc., that are employed to perform other functions and/or operations within the multi-core microprocessor.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. An apparatus for reducing replays in an out-of-order processor, the apparatus comprising:
    a first reservation station, coupled to a hold bus, configured to dispatch a first load micro instruction, and configured to detect and indicate on the hold bus if said first load micro instruction is one of a plurality of specified load instructions directed to one of a plurality of non-core resources, wherein said plurality of non-core resources are shared by a plurality of cores of the out-of-order processor;
    replay reducer circuitry configured to detect said specified load micro instruction directed to non-core resources, wherein the replay reducer circuitry is further configured to evaluate an opcode portion of a load micro instruction that implicates a noncore resource;
    replay reducer circuitry configured to evaluate an unmodified opcode portion of a load micro instruction that implicates a non-core resource, in order to detect said specified load micro instruction directed to non-core resources;
    a second reservation station, coupled to said hold bus, configured to dispatch one or more younger micro instructions therein that depend on said first load micro instruction for execution after a first number of clock cycles following dispatch of said first load micro instruction, and if it is indicated, in response to the detection by the replay reducer circuit, on said hold bus that said first load micro instruction is said one of said plurality of specified load instructions, said second reservation station is configured to stall dispatch of said one or more younger micro instructions until said first load micro instruction has retrieved an operand;
    load execution logic, coupled to said first reservation station, configured to receive and execute said first load micro instruction, and configured to enter a power savings state if no micro instructions are received for execution, wherein, if said first load micro instruction is not said specified load micro instruction, said load execution logic indicates on a miss bus if said first load micro instruction fails to successfully execute in said first number of clock cycles, thus initiating a replay of said one or more younger micro instructions, and wherein, if said first load micro instruction is said specified load micro instruction, said load execution logic does not indicate that said first load micro instruction fails to successfully execute if more than said first number of clock cycles are required to successfully execute, thus precluding a replay of said one or more younger micro instructions; and
    said plurality of non-core resources which are located outside of said plurality of cores, comprising:
    a random access memory, configured to store microcode patches corresponding to the out-of-order processor which, upon initialization, accesses said random access memory to retrieve said microcode patches.

2. The apparatus as recited in claim 1, wherein the out-of-order processor comprises a multi-core processor, and wherein each core within said multi-core processor comprises said first and second reservation stations.

3. The apparatus as recited in claim 2, wherein said one of said plurality of non-core resources comprises said random access memory, and wherein said random access memory is disposed on the same die as said each core, yet is disposed external to said each core.

4. The apparatus as recited in claim 2, wherein said one of said plurality of non-core resources is not disposed on the same die as said multi-core processor, and wherein said one of said plurality of non-core resources is accessed via a bus unit disposed on the same die as each core, yet disposed external to said each core.

5. An apparatus for reducing replays, the apparatus comprising:
   a multi-core processor, comprising a plurality of cores, wherein each of said plurality of cores comprises:
   a first reservation station, coupled to a hold bus, configured to dispatch a first load micro instruction, and configured to detect and indicate on the hold bus if said first load micro instruction is one of a plurality of specified load instructions directed to one of a plurality of non-core resources, wherein said plurality of non-core resources are shared by a plurality of cores of the out-of-order processor;
   replay reducer circuitry configured to evaluate an unmodified opcode portion of a load micro instruction that implicates a non-core resource, in order to detect said specified load micro instruction directed to non-core resources;
   a second reservation station, coupled to said hold bus, configured to dispatch one or more younger micro instructions therein that depend on said first load micro instruction for execution after a first number of clock cycles following dispatch of said first load micro instruction, and if it is indicated, in response to the detection by the reply reducer circuit, on said hold bus that said first load micro instruction is said one of said plurality of specified load instructions, said second reservation station is configured to stall dispatch of said one or more younger micro instructions until said first load micro instruction has retrieved an operand;
   load execution logic, coupled to said first reservation station, configured to receive and execute said first load micro instruction, and configured to enter a power savings state if no micro instructions are received for execution, wherein, if said first load micro instruction is not said specified load micro instruction, said load execution logic indicates on a miss bus if said first load micro instruction fails to successfully execute in said first number of clock cycles, thus initiating a replay of said one or more younger micro instructions, and wherein, if said first load micro instruction is said specified load micro instruction, said load execution logic does not indicate that said first load micro instruction fails to successfully execute if more than said first number of clock cycles are required to successfully execute, thus precluding a replay of said one or more younger micro instructions; and
   said plurality of non-core resources which are located outside of said plurality of cores, comprising:
   a random access memory, configured to store microcode patches corresponding to said multi-core processor which, upon initialization, accesses said random access memory to retrieve said microcode patches.

6. The apparatus as recited in claim 5, wherein said multi-core processor comprises an x86-compatible multi-core processor.

7. The apparatus as recited in claim 5, wherein said one of said plurality of non-core resources comprises said random access memory, and wherein said random access memory is disposed on the same die as said multi-core processor, yet is disposed external to said each of said plurality of cores.

8. The apparatus as recited in claim 5, wherein said one of said plurality of non-core resources is not disposed on the same die as said multi-core processor, and wherein said one of said plurality of non-core resources is accessed via a bus unit disposed on the same die as each of said plurality of cores, yet disposed external to said each of said plurality of cores.

9. A method for reducing replays in an out-of-order processor, the method comprising:
   disposing a plurality of non-core resources comprising a random access memory configured to store microcode patches corresponding to the out-of-order processor;
   upon initialization, accessing the random access memory to retrieve the microcode patches;
   via a first reservation station, dispatching a first load micro instruction, and detecting and indicating on a hold bus if the first load micro instruction is one of the plurality of specified load instructions directed to one of the plurality of non-core resources wherein the plurality of non-core resources are located outside of said plurality of cores and shared by a plurality of cores of the out-of-order processor;
   via a replay reducer circuit, detecting said specified load micro instruction directed to non-core resources by evaluating an unmodified opcode portion of a load micro instruction that implicates a non-core resource;
   via a second reservation station that is coupled to the hold bus, dispatching one or more younger micro instructions therein that depend on the first load micro instruction for execution after a first number of clock cycles following dispatch of the first load micro instruction, and if it is indicated, in response to the replay reducer circuit, on the hold bus that the first load micro instruction is the one of the plurality of specified load instructions, stalling dispatch of the one or more younger micro instructions until the first load micro instruction has retrieved an operand; and
   via load execution logic that is coupled to the first reservation station, receiving and executing the first load micro instruction, wherein the load execution logic is further configured to enter a power savings state if no micro instructions are received for execution, and wherein, if the first load micro instruction is not the specified load micro instruction, indicating on a miss bus that the first load micro instruction fails to successfully execute when more than the first number of clock cycles are required to successfully execute, thus initiating a replay of the one or more younger micro instructions, and wherein, if the first load micro instruction is the specified load micro instruction, not indicating that the first load micro instruction fails to successfully execute when more than the first number of clock cycles are required to successfully execute, thus precluding a replay of the one or more younger micro instructions.

10. The method as recited in claim 9, wherein the out-of-order processor comprises a multi-core processor, and wherein each core within the multi-core processor comprises the first and second reservation stations.

11. The method as recited in claim 10, wherein the one of the plurality of non-core resources comprises the random access memory, and wherein the random access memory is disposed on the same die as the each core, yet is disposed external to the each core.

12. The method as recited in claim 10, wherein the one of the plurality of non-core resources is not disposed on the same die as the multi-core processor, and wherein the one of the plurality of non-core resources is accessed via a bus unit disposed on the same die as each core, yet disposed external to the each core.

\* \* \* \* \*